United States Patent [19]
Heckenliable et al.

[11] Patent Number: 5,209,518
[45] Date of Patent: May 11, 1993

[54] DUAL-STAGE TAPERED LEAF SPRING FOR A TRAILER

[75] Inventors: Mark A. Heckenliable, Logansport; Dewayne B. Williams, Kewanna; Robert J. Dooley, Indianapolis, all of Ind.

[73] Assignee: Detroit Steel Products Co., Inc., Morristown, Ind.

[21] Appl. No.: 667,524

[22] Filed: Mar. 11, 1991

[51] Int. Cl.$^5$ .................. B60G 11/04; B60G 5/047
[52] U.S. Cl. .................. 280/680; 280/718; 267/45; 267/47; 267/36.1
[58] Field of Search .................. 280/718, 680, 686; 267/243, 244, 247, 44, 262, 36.1, 45

[56] References Cited

U.S. PATENT DOCUMENTS

| | | | |
|---|---|---|---|
| 1,221,109 | 4/1917 | Titus | 267/45 |
| 1,233,762 | 7/1917 | Doherty | 267/45 |
| 1,391,644 | 9/1921 | Threlkeld | 267/45 |
| 1,551,612 | 9/1925 | Oversmith | 267/45 |
| 2,533,511 | 12/1950 | Rowland . | |
| 3,079,139 | 2/1963 | Greene et al. | 267/47 |
| 3,580,347 | 5/1971 | McGee . | |
| 3,833,236 | 9/1974 | Davis . | |
| 3,921,965 | 11/1975 | Skerry | 267/269 |
| 3,933,367 | 1/1976 | Tamas . | |
| 4,383,703 | 5/1983 | Honda | 280/682 |
| 4,886,292 | 12/1989 | Azamatov | 280/718 |

FOREIGN PATENT DOCUMENTS

| | | | |
|---|---|---|---|
| 57-137732 | 8/1982 | Japan | 267/36.1 |
| 1337558 | 11/1973 | United Kingdom | 280/718 |

*Primary Examiner*—Karin L. Tyson
*Attorney, Agent, or Firm*—Harness, Dickey & Pierce

[57] ABSTRACT

The present invention discloses a lightweight dual-stage tapered leaf spring assembly for use in heavy-duty trailer suspension applications. The dual-leaf tapered leaf spring assembly has a main or first tapered leaf defining a first stage rate and a second tapered leaf operable to define a second stage rate. The first and second leafs are formed to include a tapered thickness profile which closely approximates a true modified parabolic taper. The "approximated" modified parabolic profiles for each of the main and second leafs are adapted to provide a smooth non-linear transition between the first and second stage rates.

14 Claims, 6 Drawing Sheets

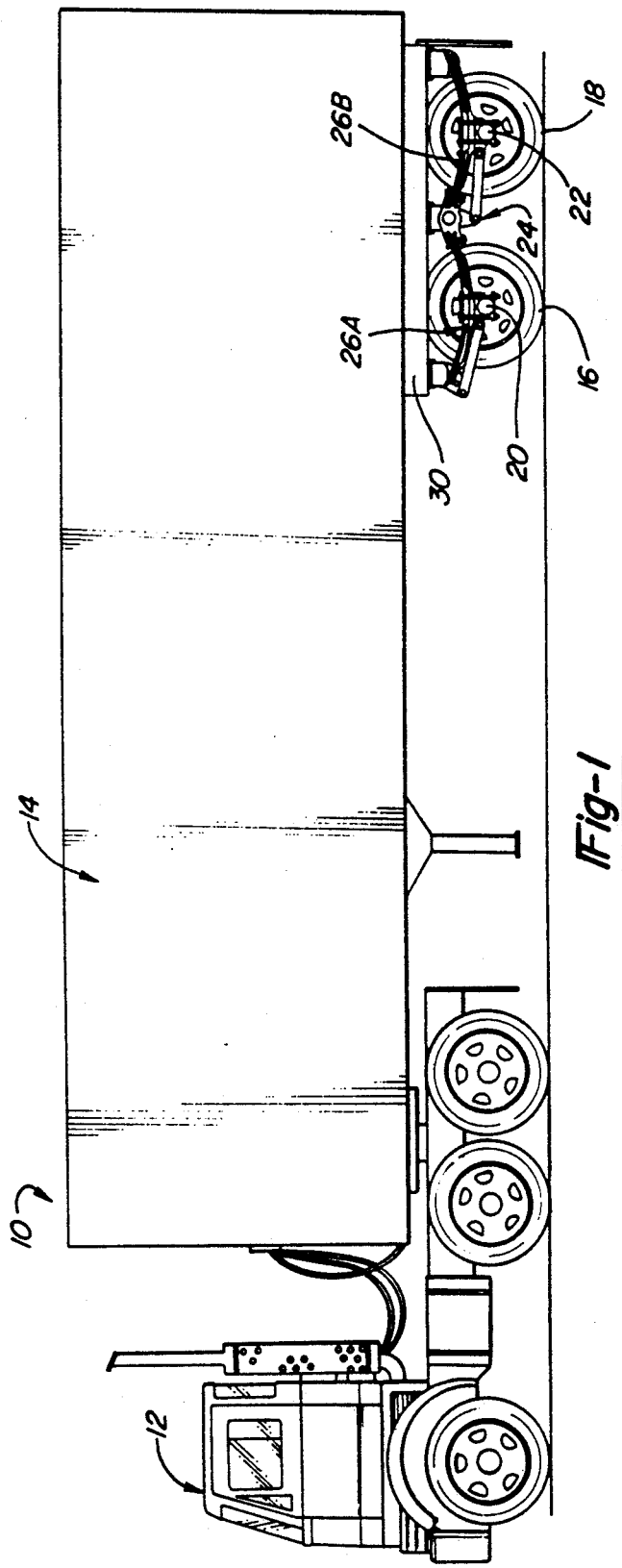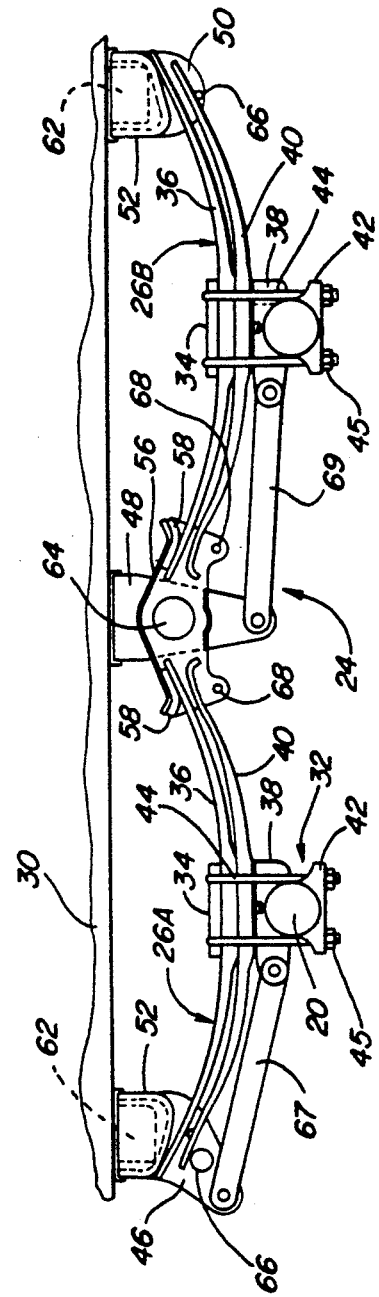

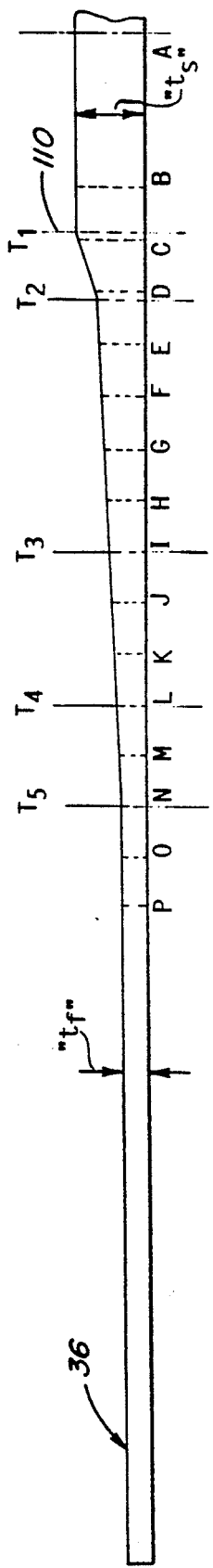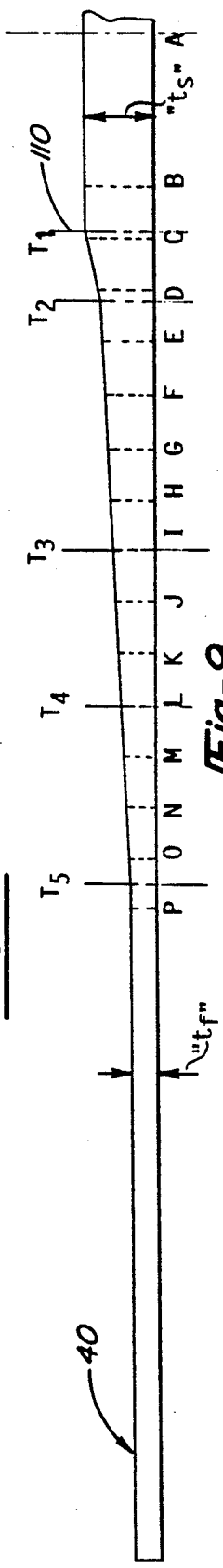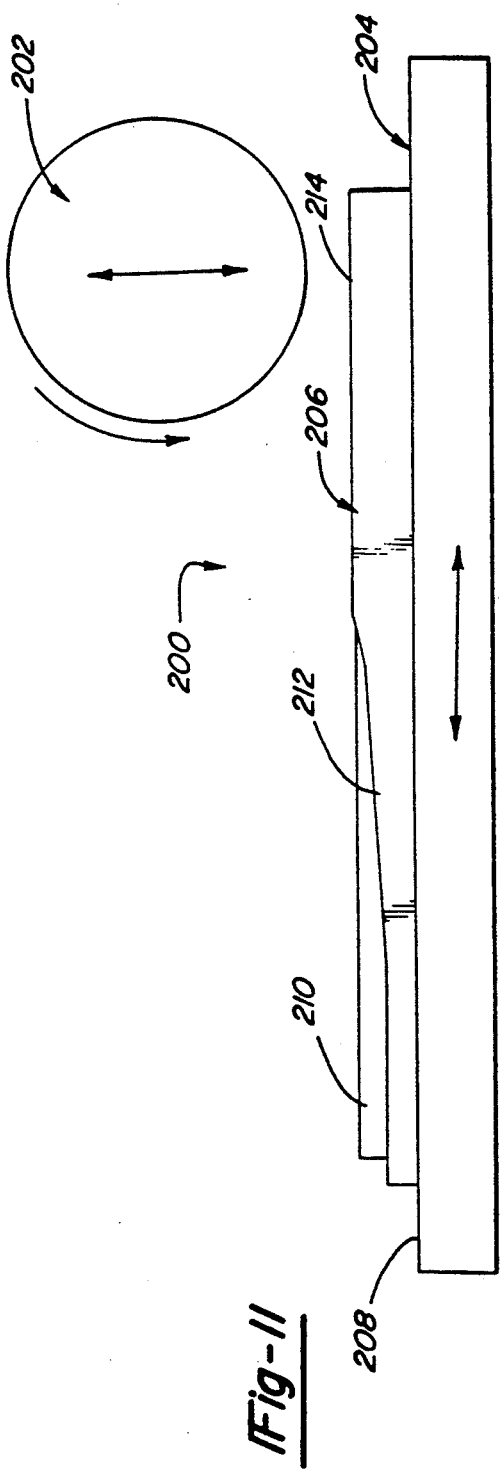

DUAL-STAGE TAPERED LEAF SPRING FOR A TRAILER

BACKGROUND OF THE INVENTION

The present invention relates to commercial vehicle suspensions and, more particularly, to a dual-stage tapered leaf spring for use in a tractor-trailer suspension assembly.

In general, most trailers, (such as specialty carriers, tankers, dry freight haulers, etc.) are equipped with non-driven single, tandem or multi-axle assemblies. Conventionally, the suspension systems provided for supporting and damping the relative movement between each axle and the trailer frame have included single-stage multi-leaf springs, pneumatic spring systems or a combination thereof. The vast majority of trailers are equipped with single-stage multi-leaf springs which are designed to mechanically dampen the trailer when "loaded" to preserve its cargo and provide adequate roll stiffness. Multi-leaf springs are a class of leaf springs having a plurality of three or more constant thickness stepped-length leafs which are stacked to form a constant rate leaf spring assembly. As such, single-stage multi-leaf springs are not designed to differentiate between "loaded" and "unloaded" trailer operation and thus normally provide a firm or "stiff" ride during loaded operation. Unfortunately, this "stiff" ride causes excessive suspension vibration and reduced wheel control during "unloaded" trailer operation which detrimentally impacts the useful service life of the trailer while causing an undesirably harsh ride for the vehicle operator.

Conventionally, trailer suspension applications equipped with dual-stage leaf springs for providing a variable or progressive rate (i.e. "soft" ride when unloaded and "stiff" ride when loaded) have been extremely limited due to the availability of pneumatic systems. However, when dual-stage leaf springs have been used it is common to employ a massive and in-efficient first stage multi-leaf spring having an additional second stage leaf mounted thereto. Traditionally, the first stage multi-leaf spring is sized to provide the low rate "soft" ride when the trailer is unloaded (i.e. curb load) with the second stage leaf being inactive. When the trailer is loaded (i.e. design load), the second stage leaf becomes actively loaded for causing the overall rate to increase so as to produce a firmer ride. According to one method, a "helper" spring is mounted above the main spring of the first-stage multi-leaf spring and does not support any load until it engages camming pads for resisting further deflection of the multi-leaf first stage. As such, the change in rate and, in turn, the ride stiffness is necessarily abrupt and harsh. Alternatively, dual-stage leaf springs may have one or more relatively thick second stages leafs mounted below and adjacent to the shortest leaf of the "first stage" portion of the multi-leaf leaf spring. Upon deflection, rolling contact is made between the second stage leafs and the first stage for producing the increased rate. Again however, the rate transition is typically abrupt.

While dual-stage leaf springs have been used in various light-duty truck applications, such springs have not been used in the heavy-duty trailer industry. This is primarily due to the fact that heavy-duty trailer suspensions must be designed to function for a significantly larger load-carrying range than is required of modern ligh-duty vehicles. As such, dual-stage multi-leaf springs are heavy and require a significant range of deflection to provide the desired rate transition. These design constraints have made utilization of conventional multi-leaf dual-stage springs impractical for many trailer suspension applications.

Modernly, pneumatic suspension systems are being installed in trailers to provide means for variably adjusting the rate in response to changes in the load carried by the trailer. However, pneumatic suspension systems are typically quite expensive and require additional structural components for providing sufficient roll and wind-up stiffness in most commercial heavy-duty trailer applications.

SUMMARY OF THE INVENTION

Accordingly, it is a primary object of the present invention to provide a lightweight dual-stage tapered leaf spring assembly for use in heavy-duty trailer suspension applications. More particularly, the present invention is directed to an improved dual-leaf tapered leaf spring assembly having a main or first tapered leaf defining a first stage rate and a second tapered leaf operable to define a second stage rate. The first and second leafs are formed to include a tapered thickness profile which closely approximates a true modified parabolic taper.

Upon installation into the trailer suspension system, the remote ends of the main leaf operably engage hanger cams suspended from the trailer frame. The second leaf is operably mounted below the main leaf and is adapted to move between positions of non-engagement and engagement with the main leaf in response to deflection of the leaf spring assembly. The "approximated" modified parabolic profiles for each of the main and second leafs are adapted to provide a smooth non-linear transition between the first and second stage rates (i.e. between "curb" and "design" loads) as compared to the excessively abrupt linear transition associated with conventional dual-stage multi-leaf springs. More specifically, the smooth non-linear rate transition is generally parabolic and includes first and second arcuate transition regions. The first arcuate transition region is relatively large and occurs upon the cranked ends of the second tapered leaf engaging and rolling in on the main leaf upon continued axle displacement for effectively shortening the second leaf moment arm. The second arcuate transition region occurs upon continued leaf spring deflection in response to the main leaf rolling in on the hanger cams for effectively shortening the main leaf moment arm. The first and second arcuate regions of the transition curve are interconnected by a fairly linear load deflection region which occurs following second leaf engagement and prior to the shortening of the main leaf. As such, the cumulative effect of the improved tapered profiles and unique two-stage camming action is to provide a smooth non-linear rate transition between the lower first stage rate and the higher second stage rate so as to define a variable rate leaf spring assembly.

In a related object, the main tapered leaf of the dual-stage dual-leaf spring of the present invention is designed to have a higher working (i.e. bending) stress level than the second tapered leaf. In addition, the working stresses for each of the tapered leafs are uniformly distributed over their entire length due to the "approximated" modified parabolic tapered thickness profile of each of the leafs. As such, the service life and ride characteristics associated with the lightweight high-stress tapered leaf spring assembly of the present invention are superior to conventional non-tapered and linearly tapered multi-leaf springs while causing uniform stress distribution in a manner heretobefore only associated with true parabolical tapered profile. Furthermore, the present invention is material efficient and designed to maintain sufficient interleaf clearance for permitting smooth second leaf to main leaf engagement without causing excessive interleaf contact or friction upon the full range of axle deflection. Elimination of interleaf friction lends itself to substantially lower frictional losses whereby the available potential energy (i.e. damping) is substantially increased.

According to a preferred embodiment, the tapered thickness profile for each the first and second leafs incorporates a series of successive linearly tapered increments which approximate a true modified parabolic taper profile. More particularly, the successive linearly tapered increments define a plurality of sequential transition points which each define a different amount of thickness taper per unit of length measure for effectively minimizing the mass of material used while concurrently achieving uniform stress levels. As such, the "approximated" modified parabolic taper effectively replicates a true parabolic tapered spring in configuration and function so as to provide maximized spring efficiency at a realistic production cost.

It is a further object of the present invention to provide a dual-stage dual-leaf tapered leaf spring that can be operatively installed in virtually any single, tandem or mult-iaxle commercial trailer as an original equipment suspension component or a retro-fit replacement.

Various other objects, advantages and features of the present invention will become readily apparent to one skilled in the art upon reading the following specification taken in conjunction with the accompanying drawings and appended claims.

BRIEF DESCRIPTION OF THE DRAWINGS

FIG. 1 is a schematic view of an exemplary commercial tractor-trailer combination having a trailer supported from tandem axles by front and rear pairs of dual-stage dual-leaf tapered spring assemblies which incorporate the teachings of the present invention;

FIG. 2 is a partially broken away side view of the tandem axle suspension assembly shown in FIG. 1;

FIG. 8 is a thickness taper profile for a portion of the main leaf illustrating the plurality of successive linearly tapered increments which approximate the modified parabolic taper of FIG. 7;

FIG. 9 is a view similar to FIG. 8 illustrating the thickness taper profile for a portion of the second leaf;

FIG. 11 is a schematic view of a method and apparatus for forming the "approximated" modified parabolic tampered thickness profiles of the present invention.

DESCRIPTION OF THE PREFERRED EMBODIMENT

Figure 3:
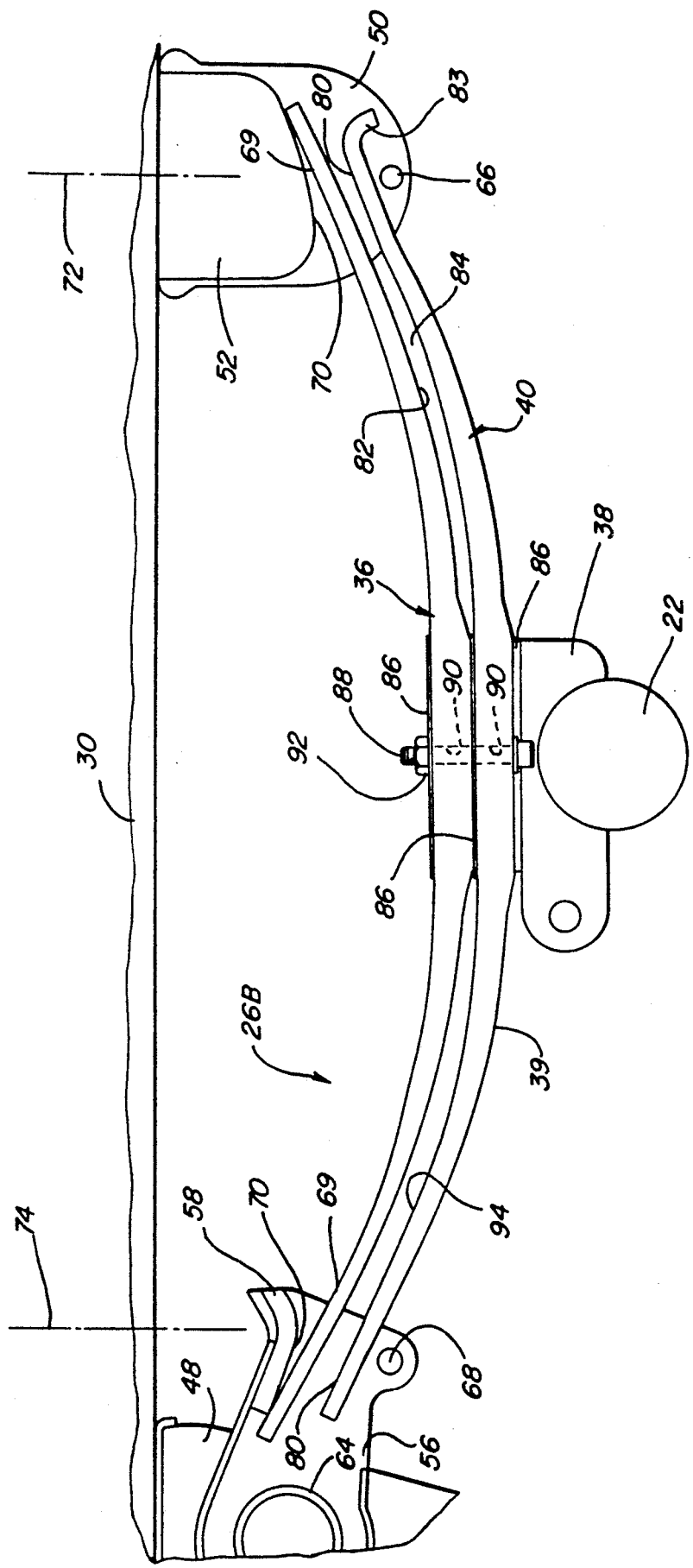
FIG. 3 is an enlarged partially disassembled view of the rear dual-stage dual-leaf spring assembly of FIG. 2 deflected to its "curb" load first stage operative position.

In general, the present invention is directed to a variable or progressive rate leaf spring assembly for use in tractor-trailer vehicle suspension systems. Furthermore, the lightweight high-stress tapered leaf spring assembly of the present invention is readily adapted for installation in virtually all single, tandem and/or multi-axle trailer suspension systems for supporting and damping relative movement between the trailer frame and each of the axles.

According to a preferred embodiment of the present invention, a dual-stage dual-leaf spring assembly is disclosed which incorporates a tapered thickness profile adapted to approximate a "modified parabolic" taper. As will be appreciated, the primary functional characteristics of trailer suspension systems are defined by the "rate" and "static deflection" of the leaf spring. The rate is the leaf spring's change in load per unit of deflection (lbs/inch). Static deflection (inches) is derived by dividing the rate at a static load position by the static load for determining the "stiffness" of the suspension and the ride frequency of the vehicle. A "soft" ride requires a relatively large static deflection of the vehicle's suspension system while a "firm" ride generally requires a smaller amount of static deflection. It is to be understood that the tapered dual-leaf spring assembly of the present invention is primarily adapted for incorporation into heavy-duty trailer suspension application which operate within a large variation in load carrying capacity to provide desireable ride and load handling characteristics under the entire range of loaded conditions.

With particular reference now to FIG. 1, an exemplary tractor-trailer combination 10 is shown. More particularly, tractor 12 is operatively coupled to trailer 14 in a known manner for transporting a cargo (i.e. gas, building supplies, machinery, cement, etc.). Tractor-trailer 10 is exemplary in nature and is merely intended to illustrate one type of heavy-duty commercial transport vehicle to which the present invention is directed.

Trailer 14 is shown to be of the tandem axle type, that is, the end of trailer 14 remote from tractor cab 12 is supported by one or more sets of front and rear wheels 16 and 18, respectively, which are rotatably mounted to front and rear axles 20 and 22, respectively, arranged one behind the other in a tandem relationship. A mechanical suspension system 24 is provided for damping relative movement between trailer 14 and axles 20 and 22. For purposes of clarity, FIG. 1 shows trailer 14 with its driver side suspension and wheels removed for providing a better view of mechanical suspension system 24. As will be detailed hereinafter, the present invention is directed to a unique dual-leaf tapered leaf spring assembly which is adapted for use with virtually any conventional trailer suspension system or axle arrangement of the type incorporating multi-leaf spring assemblies. Suspension system 24 is shown to include a pair of front leaf springs 26A (one on each side of trailer 14)

and a pair of rear leaf springs 26B (one of each side of trailer 14) aligned in tandem relationship. Preferably, front and rear springs 26A and 26B, respectively, are substantial identical in configuration and operational characteristics. In general, front and rear pairs of leaf springs 26A and 26B, respectively, are adapted to be operably mounted between frame stringers 30 (frame stringers 30 are located on both sides of trailer 14) and their respective front and rear axles 20 and 22 for supporting and damping the relative movement therebetween.

With particularly reference to FIG. 2, leaf springs 26A and 26B are shown as being connected at their mid-points to front and rear axles 20 and 22 in an "overslung" manner using conventional clamping means 32. More specifically, the connections are preferably identical for both front and rear springs 26A and 26B, respectively, with clamping means 32 comprised of a top clamp member 34 configured to embrace an inactive portion of the upper "tension" surface of main leaf 36 for leaf springs 26A and 26B. An upper face of a lower axle seat 38 engages a generally flat inactive portion of the lower "compression" surface 39 of a second leaf 40. The lower face of lower axle seat 38 is shaped complimentary to and engageable with its respective axle. Similarly, a lower saddle clamp 42 is disposed below and matingly engages its respective axle. U-bolts 44 and torque nuts 45 are adapted to securely mount front and rear axles 20 and 22, respectively, to front and rear pairs of leaf springs 26A and 26B, respectively, in a known matter such that any movement of the axles causes a corresponding deflection or movement of leaf springs 26.

Each front leaf spring 26A is supported between a front hanger bracket 46 and a center hanger bracket 48 which are both mounted to frame stringers 30. Likewise, each rear leaf spring 26B is supported between central hanger bracket 48 and a rear hanger bracket 50. Front and rear hanger brackets 46 and 50, respectively, include bearing or cam pads 52 against which the outer non-adjacent ends of main leaf 36 for each of front and rear leaf springs 26A and 26B, respectively, are adapted to engage. As such, front hanger brackets 46 and rear hanger brackets 50 are secured to the trailer's chassis frame stringers 30 at locations corresponding to the remote ends of leaf springs 26. An equalizer member 56 is supported within center hanger bracket 48 and includes a pair of similarly angled bearing pads 58 which are adapted for normal engagement with the inner adjacent ends of front and rear pairs of leaf springs 26A and 26B, respectively. Front, center and rear hanger brackets 46, 48 and 50, respectively, are generally inverted U-shaped structural members having downwardly extending side plates between which the respective leaf springs 26 and equalizer member 56 are disposed. Furthermore, front and rear hanger brackets 46 and 50, respectively, are provided on opposite sides of trailer 14 and are fixedly interconnected via cross-support tubes 62 for providing structural rigidity. Likewise, each equalizer member 56 is mounted inside its central hanger bracket 48 between its respective side plates and are fixedly interconnected via a cross-support tube 64 extending transversely between frame stringers 30. In addition, retainer tubes 66 and 68 extend transversely between the side plates of front and rear hanger brackets 46 and 50, respectively, and equalizer member 56 to inhibit dislocation of front and rear leaf springs 26A and 26B, respectively, and which are located beneath the ends of second leaf 40.

As noted above, and as is standard in most tandem axle suspensions, the non-uniform loading on the inner adjacent ends of front and rear leaf springs 26A and 26B are equalized via equalizer 56. A front torque rod 67 is connected between the side plates of front hanger bracket 46 and axle seat 38 of front leaf springs 26A while a second torque tube 69 is interconnected between the side plates of center hanger bracket 48 and spring seat 38 of rear leaf springs 26B. As previously noted, while the leaf springs 26 of the present invention is shown in a tandem axle arrangement it will be appreciated that leaf springs 26 can be installed in other suitable mechanical suspension systems and axle arrangements.

With particular reference now to FIG. 3, one of rear leaf springs 26B is shown in greater detail with several of the center clamping components removed for additional clarity. Since front leaf springs 26A are substantially identical to rear leaf spring 26B, the following description is likewise applicable thereto. As is apparent, leaf spring 26B includes first or main tapered leaf 36 having its opposite terminal end portions of its upper "tension" surface 69 in engagement with angled cam surface 70 of cam pad 52 and bearing pad 58 at positions outwardly of "roll-in" centerlines 72 and 74, respectively. As such, the effective "active" length of main leaf 36 is at its greatest length when trailer 14 is at its "curb" loaded capacity. Moreover, in the position shown, leaf spring 26B is deflected to the first stage "curb" loaded (i.e. trailer 14 is substantially unloaded) position. At "curb", it is desirable to have a relatively low rate for a "soft" ride characteristic when trailer 14 is being transported in its substantially "unloaded" condition. As such, the limited engagement of main leaf 36 with surface 70 of cam pad 52 and bearing pad 58 defines a "first stage" rate with ends 80 of second leaf 40 spaced below and disengaged therefrom. Each end 80 of second leaf 40 is cranked or slightly downturned to define a roll-in "contact" area specifically designed to engage the underside "compression" surface 82 of main leaf 36 upon continued axle deflection. In addition, one cranked end 80 of second leaf 40 terminates in a downturned hook 83. The cranked ends 80 are adapted to maintain a relatively constant interleaf gap opening 84 spanning between the "inactive" central clamped portion of the leafs and the contact area of cranked ends 80. As will be described hereinafter in greater detail, each of first and second leafs 36 and 40, respectively, is formed to include a tapered thickness profile which effectively "approximates" a true modified parabolic surface and insures maintenance of interleaf gap 84. Furthermore, internal gap 84 provides the clearance necessary to promote smooth second leaf 40 to main leaf 36 engagement and roll-in without generating excessive interleaf contact or friction. As such, the present invention lends itself to low friction losses for keeping the potential energy (i.e. available damping) within the desired range of loaded and unloaded conditions.

Following the tapering operation to be described, each of first and second leafs 36 and 40, respectively, are cambered to produce the generally semi-elliptical curvature shown from utilization of conventional hot forming and quenching processes. As noted, each of first and second leafs 36 and 40, respectively, has an "inactive" central clamped area of a predetermined length having spacers 86 disposed therebetween. A center bolt 88 passes through center bolt holes 90 punched in each leaf and a lock nut 92 is torqued thereon to rigidly clamp leafs 36 and 40 as dual-leaf spring assembly 26B.

Figure 4:
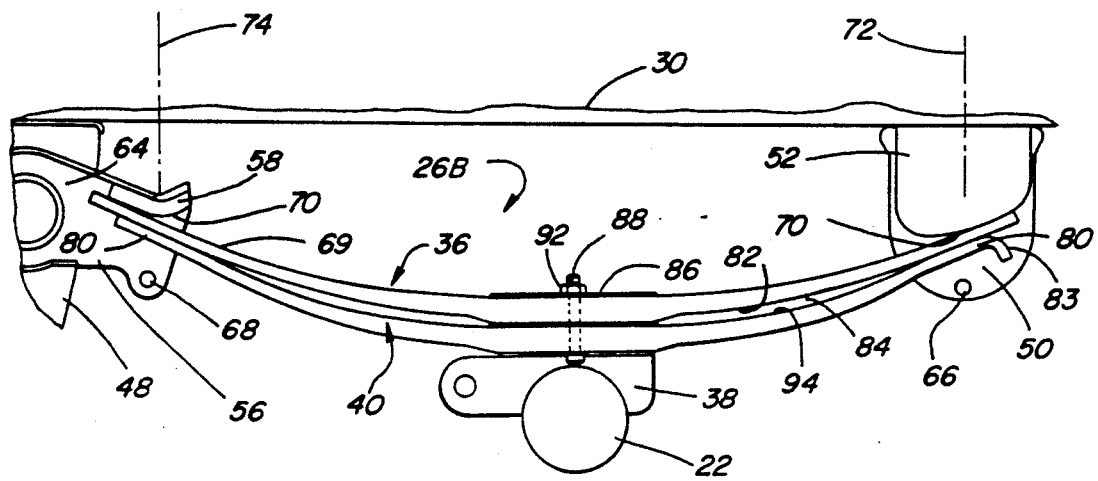
FIG. 4 is a view, similar to FIG. 3, showing the dual-stage dual-leaf spring assembly in an "intermediate" loaded transition stage position.
Figure 5:
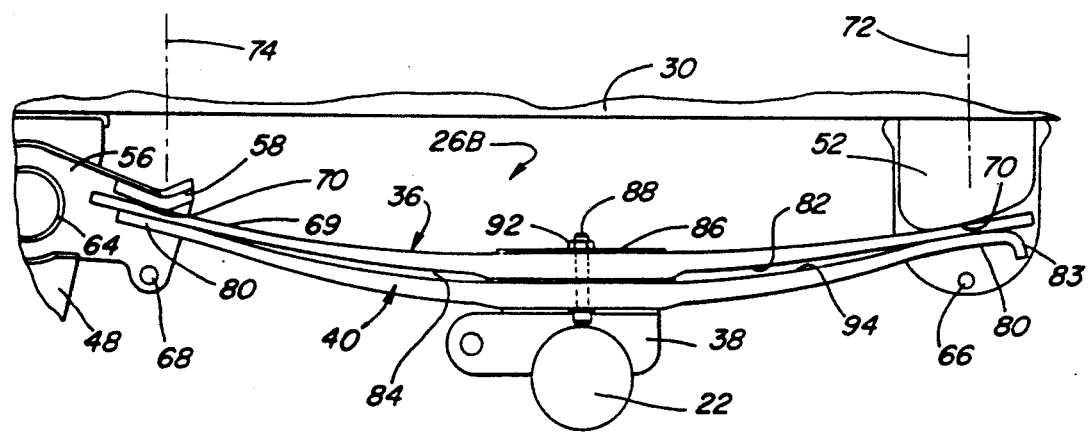
FIG. 5 is a view, similar to FIG. 3, illustrating the dual-stage dual-leaf spring assembly deflected to its "design" load second stage operative position.
Figure 6:
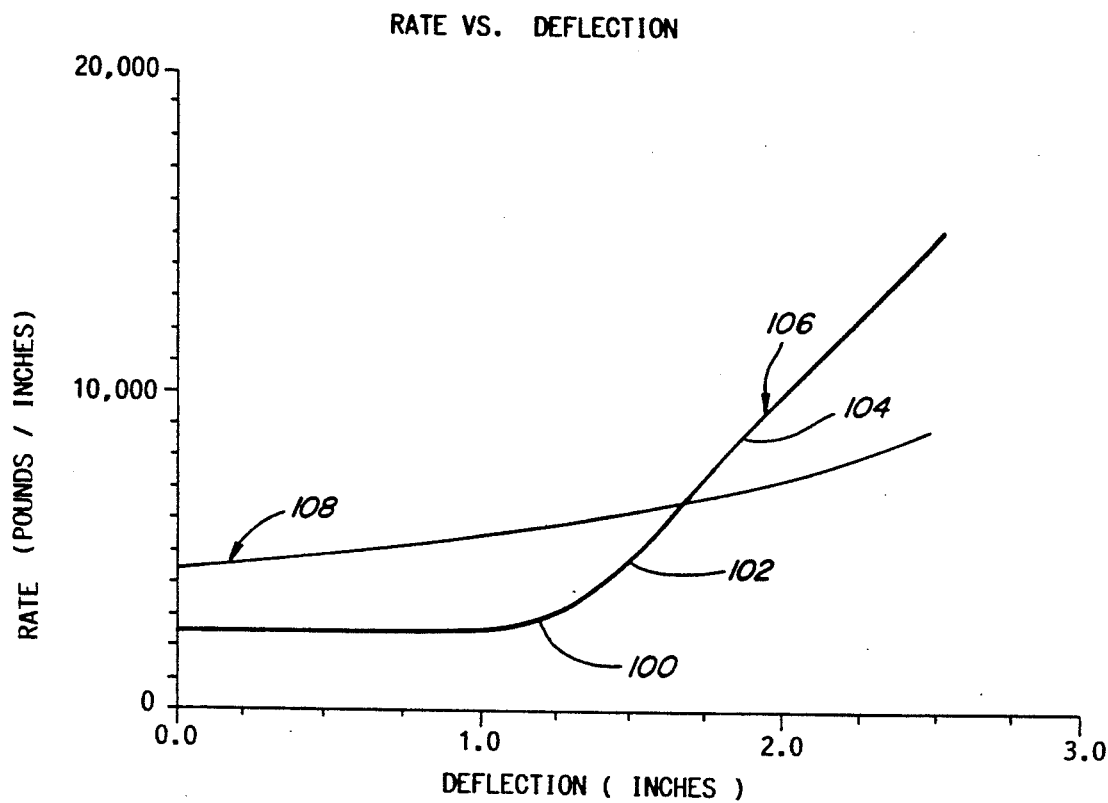
FIG. 6 is an exemplary comparative graph illustrating the rate vs deflection characteristics of the leaf spring assembly shown in FIGS. 3 through 5 relative to a conventional multi-leaf single-stage leaf spring.

With reference now to FIGS. 4 and 5, various deflected positions of leaf spring 26B are shown. While these Figures are similar to FIG. 3, they are intended to illustrate the "camming" action of both leafs upon continued axle displacement. In particular, as the load on trailer 14 is increased past the "curb" load level, second leaf 40 is sufficiently deflected until the contact areas on its outer most cranked end portions 80 on its upper tension surface 94 engage the underside "compression" surface 82 of main leaf 36 to initiate the rate transition from the lower first stage rate to a higher second stage rate ride characteristic. In effect, instead of an abrupt and harsh linear load transition point as is typically associated with conventional dual-stage multi-leaf springs, the present invention provides for a smooth non-linear transition which is generally parabolic in nature. More particularly, crank ends 80 of second leaf 40 are adapted to "roll-in" from the "curb" position shown in FIG. 3 to the initial contact position shown in FIG. 4 with respect to centerlines 72 and 74 upon continued suspension deflection to provide a relatively long initial parabolic transition segment 100 (see FIG. 6). This sliding or rolling action effectively shortens the "active" length or moment arm of second leaf 40. However, upon continued deflection of leaf spring 26B, the loading thereon approaches the "design load" level, wherein tension surface 69 of main leaf 36 begins to "roll-in" on surface 70 of hanger cams 52 and 58 for effectively shortening the "active" length thereof so as to create a second parabolic transition portion 102 (FIG. 6). As best seen in FIG. 5, at "design load" both main leaf 36 and second leaf 40 have effectively rolled in relative to centerlines 72 and 74. In fact, the tapered profiles of each leaf and the change in effective length act to produce a variable rate as shown at 104 in FIG. 6. The various rate transition regions are best seen from the exemplary rate vs deflection curve of FIG. 6 which shows the smooth and relatively long cumulative transition curve 106 of leaf spring 26B compared to the constant rate curve 108 for a conventional single-stage multi-leaf spring.

With particular reference now to FIGS. 7 through 10, the principles embodied within the "approximated" modified parabolic tapered thickness profiles of first and second leafs 36 and 40, respectively, will now be described in greater detail. In general, it is known that tapered leaf springs provides superior volumetric material efficiency as compared to a conventional constant thickness multi-leaf spring assembly designed to provide similar operational characteristics. This volumetric efficiency defines the amount of potential energy which leaf spring 26B is capable of storing at a specified stress level relative to its volume of "active" material. Therefore, it is desireable to utilize a tapered leaf springs since they are more efficient and have a relatively constant stress distribution from its line of encasement (starting taper point 110 at end of the "clamped" area) to its point of load application.

Figure 7:
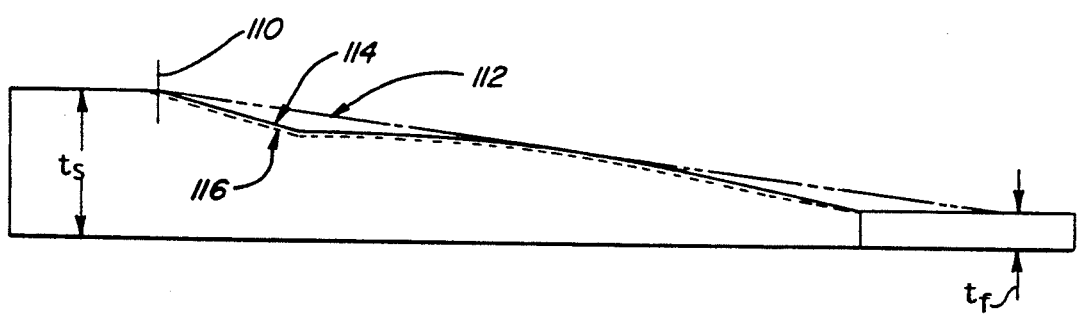
FIG. 7 is a schematic illustration of a modified parabolic tapered profile and a linear tapered profile.

With reference to FIG. 7, a schematic comparison is shown between a single linearly tapered thickness profile 112 and a true modified parabolic tapered profile 114 are shown. Each thickness profile begins tapering at point 110 from a starting thickness "$t_s$" and terminates at a predetermined end thickness "$t_f$". Taper profile 114 is referred to as "modified" since a "true" parabolic taper decreases in thickness to zero thickness at the point of loading such that "$t_f$" would equal zero. As such, a modified parabolic taper includes an end portion of a known thickness "$t_f$" for facilitating load application. However, a modified parabolic taper is an impractical design based on prohibitive production costs and manufacturing constraints. Therefore, the present invention is directed at utilization of a tapered thickness profile which "approximates" a modified parabolic taper for maximum material efficiency at a realistic production cost. This profile is shown schematically at 116 in FIG. 7. Moreover, exemplary approximated modified parabolic taper profiles of the type utilized in both of first and second leafs 36 and 40, respectively, are shown in FIGS. 8 and 9 which substantially replicate the true parabolic profile shown in FIG. 7.

More particularly, as can best be seen from FIGS. 8 and 9, the tapered profiles of first and second leafs 36 and 40, respectively, approximate or "track" a modified parabolic taper by incorporating a successive plurality of linearly tapered increments having distinct and different transition points. More particularly, according to the embodiment shown there are five transition points T1 through T5 for each leaf having an predetermined change in taper (inch per inch) which are specifically selected to minimize the material volume and achieve a higher and more uniform stress distribution throughout the entire leaf length. The initial quick taper ($T_1$ to $T_2$) allows the working stress from each leaf to be transferred more uniformly to inhibit premature stress-related failure in the center clamp area.

For purpose of example only, Tables 1 through 4 list transitional taper information and point thickness information for leaf members 36 and 40 for leaf spring 26B. As will be appreciated, the specific modified parabolic taper profile for second leaf 40 is independent of and different than the modified parabolic taper profile for first main leaf 36. This is done to provide a higher working stress level in main leaf 36.

With reference to FIG. 8, Table 1 provides the incremental tapers for one-half of main leaf 36 (the other half being identical).

TABLE 1

| TRANSITION DATA - MAIN LEAF | |
|---|---|
| TRANSITION POINTS | INCREMENTAL TAPER (INCH/INCH) |
| $T_1$ TO $T_2$ | .314 |
| $T_2$ TO $T_3$ | .037 |
| $T_3$ TO $T_4$ | .047 |
| $T_4$ TO $T_5$ | .043 |

Similarly, Table 2 provides the incremental tapers for one-half of second leaf 40 shown in FIG. 9.

TABLE 2

| TRANSITION DATA - SECOND LEAF | |
|---|---|
| TRANSITION POINTS | INCREMENTAL TAPER (INCH/INCH) |
| $T_1$ TO $T_2$ | .220 |
| $T_2$ TO $T_3$ | .039 |
| $T_3$ TO $T_4$ | .045 |
| $T_4$ TO $T_5$ | .053 |

Figure 10:
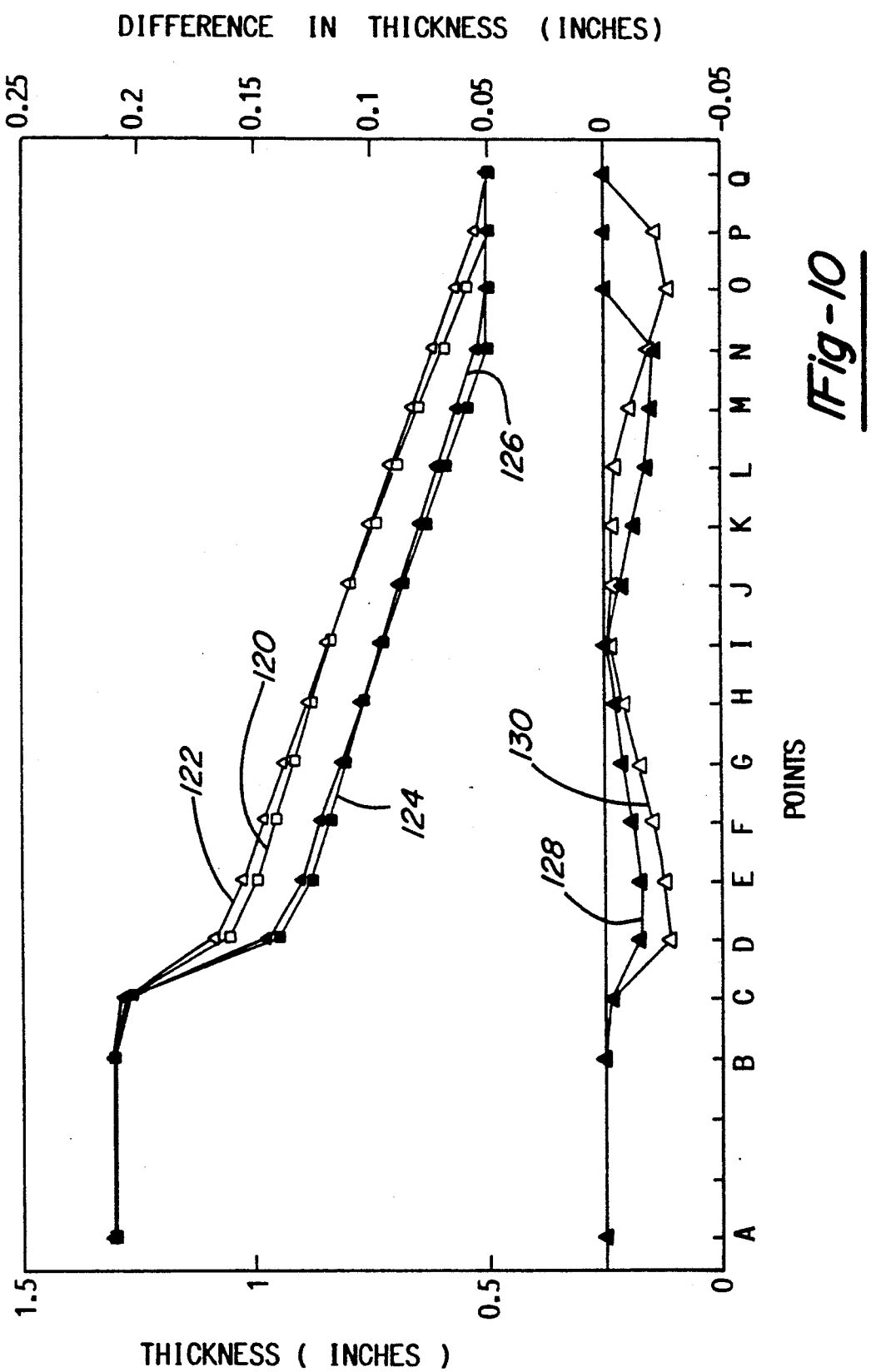
FIG. 10 is an exemplary graphical illustration of the thickness taper profiles of FIGS. 8 and 9 as compared to a conventional linearly tapered leaf spring.

With reference now to Tables 3 and 4, the taper information for various comparison curves of FIG. 10 are disclosed. More specifically, curve 120 represents the modified parabolic taper profile of main leaf 36; curve 122 represents a constant linear taper profile comparison; curve 124 represents the modified parabolic taper profile of second leaf 40; and curve 126 designates its corresponding comparative constant linear taper. As is apparent, curves 120 and 124 closely "track" the true modified taper shown in FIG. 7. The difference information listed in Tables 3 and 4, and represented in plots 128 and 130 of FIG. 10, show the substantial impact the modified taper profile has on material utilization and working stresses relative to a constant linear taper.

TABLE 3

TAPER COMPARISON - MAIN LEAF (36)

| REFERENCE POINT | "APPROXIMATED" PARABOLIC TAPER (INCHES) | LINEAR TAPER (INCHES) | LINEAR DIFFERENCE (INCHES) |
|---|---|---|---|
| A | 1.300 ($t_s$) | 1.300 | 0.000 |
| B | 1.300 | 1.300 | 0.000 |
| C | 1.262 | 1.264 | −0.002 |
| D | 0.948 | 0.964 | −0.016 |
| E | 0.875 | 0.890 | −0.015 |
| F | 0.837 | 0.849 | −0.012 |
| G | 0.800 | 0.808 | −0.008 |
| H | 0.762 | 0.767 | −0.005 |
| I | 0.725 | 0.726 | −0.001 |
| J | 0.678 | 0.685 | −0.007 |
| K | 0.632 | 0.644 | −0.012 |
| L | 0.585 | 0.603 | −0.018 |
| M | 0.543 | 0.562 | −0.019 |
| N | 0.500 ($t_f$) | 0.521 | −0.021 |
| O | 0.500 | 0.500 | 0.000 |
| P | 0.500 | 0.500 | 0.000 |

TABLE 4

TAPER COMPARISON - SECOND LEAF (40)

| POINT | "APPROXIMATED" PARABOLIC TAPER (INCHES) | LINEAR TAPER (INCHES) | LINEAR DIFFERENCE (INCHES) |
|---|---|---|---|
| A | 1.300 ($t_s$) | 1.300 | 0.000 |
| B | 1.300 | 1.300 | 0.000 |
| C | 1.274 | 1.277 | −0.003 |
| D | 1.053 | 1.081 | −0.028 |
| E | 0.991 | 1.017 | −0.026 |
| F | 0.952 | 0.972 | −0.020 |
| G | 0.913 | 0.927 | −0.014 |
| H | 0.874 | 0.882 | −0.008 |
| I | 0.835 | 0.837 | −0.002 |
| J | 0.789 | 0.792 | −0.003 |
| K | 0.744 | 0.747 | −0.003 |
| L | 0.698 | 0.702 | −0.004 |
| M | 0.646 | 0.657 | −0.011 |
| N | 0.593 | 0.612 | −0.019 |
| O | 0.540 | 0.567 | −0.027 |
| P | 0.500 ($t_f$) | 0.522 | −0.022 |
| Q | 0.500 | 0.500 | 0.000 |

With reference now to FIG. 11, a method and apparatus for forming the "approximated" modified parabolic taper for the first and second leafs 36 and 40, respectively, is schematically shown. In general, a taper rolling apparatus 200 includes a vertically movable roll 202 and a horizontally movable carriage 204. Left and right cam dies 206 (one shown) are securely afixed to a top surface 208 of carriage 204 in a predetermined spaced relationship adapted to permit one or more pieces of constant thickness bar stock 210 to be disposed therebetween. Cam dies 206 are cut to include a cammed rolling surface 212 which corresponds to the desired approximated modified parabolic taper. In addition, cam profile dies 206 are designed to compensate for thermal shrinkage of bar stock 210 following the hot taper rolling process.

According to the preferred method, constant thickness bar stock 210 is heated to a predetermined elevated temperature and is located between cam profile dies 206. Carriage 204 is then moved into a position such that roll 202 die may be lowered into engagement with a generally linear roll start surface 214 of cam profile dies 206. Preferably, roll 202 is rotatably driven concurrently with the horizontal movement of carriage 204 to cause roll 202 to follow the contour of cam die 206. As such, a majority of the material flow is in a lengthwise direction. The number of "passes" or rolling operations required for roll 202 to completely follow the entire cam die surface 212 is dependent on the severity and length of the taper desired. Thereafter, the second half of bar stock 210 is tapered (rolled) in a similar manner. Following the tapering operation, the tapered leafs 36 and 40 are reheated, hot formed and then quenched to the desired semi-elliptical curvature. The hot forming operations are adapted to provide cranked ends 80 and hook 90 on second leaf 40.

The foregoing discussion discloses and describes an exemplary embodiment of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. In a suspension system for a trailer having axle means and a chassis frame, first and second hanger means mounted on each side of said chassis frame, and a dual-stage tapered leaf spring operably coupled to said axle means and disposed between said first and second hanger means for damping the relative movement between said axle means and said chassis frame, said dual-stage tapered leaf spring comprising:

a first leaf member having its upper end surfaces in sliding contact with cam surface means provided on said first and second hanger means, said first leaf member having a first tapered thickness profile; and a second leaf member disposed below and coupled to said first leaf member such that its upper end surfaces are adapted to move between positions of disengagement and engagement with lower end surfaces of said first leaf member in response to deflection of said leaf spring means, said second leaf member having a second tapered thickness profile;

wherein each of said first and second tapered thickness profiles include a series of more than three successive linearly tapered increments which each define a different amount of thickness taper per unit of length measurement, said linearly tapered increments having different incremental tapers sequentially arranged and configured to track a modified parabolic taper profile.

2. The suspension system of claim 1, wherein said upper end surfaces of said second leaf member are normally disengaged from said lower end surfaces of said first leaf member when said trailer is operating in a first loaded condition such that engagement of said upper end surfaces of said first leaf member with said cam surface means causes said leaf spring means to provide a soft damping characteristic, and wherein said upper end surfaces of said second leaf member are adapted to engage said lower end surfaces of said first leaf member when said trailer is operating in a second loaded position for providing a firmer damping characteristic.

3. The suspension system of claim 1, wherein said first and second leaf members have a predetermined curvature such that an internal gap is located between a central clamp portion of said leaf spring and said engaging end surfaces thereof when said trailer is operating in said second loaded condition, said internal gap provided for substantially eliminating interleaf friction between said first and second leaf members during deflection thereof during operation of said trailer in either of said first and second loaded conditions.

4. The suspension system of claim 3, wherein said first and second tapered thickness profiles and sliding engagement of said second leaf member relative to said first leaf member are coactive to provide a generally parabolic first rate transition in response to deflection of said second leaf member from said engagement position toward a position corresponding to said trailer operating in said second loaded condition, said sliding engagement adapted to effectively shorten the active length of said second leaf member.

5. The suspension system of claim 4, wherein said first and second tapered thickness profiles and rolling engagement of said first leaf member relative to said cam surface means are coactive to provide a generally parabolic second rate transition between said first rate transition and said deflected position corresponding to said second loaded condition in response to still further deflection of said first and second leaf members.

6. The suspension system of claim 5, wherein said working stress level of said first leaf member is greater than that of said second leaf member, and wherein each of said first and second tapered thickness profiles are configured to uniformly distribute said working stresses across substantially the entire active length of said first and second leaf members respectively.

7. The suspension system of claim 4, wherein said axle means defines a front and rear tandem axle arrangement with a pair of said leaf springs mounted in tandem alignment one behind the other on each side of said chassis frame, each of said leaf springs including clamp means for coupling the mid-portion of said first and second leaf members for each of said tandem leaf springs to said front and rear axles respectively such that said tandem leaf springs have inner ends disposed adjacent to one another and outer ends spaced remotely from one another, and equalizer means operably located between said first and second hanger means such that said adjacent upper end surfaces of said tandem leaf springs are in sliding contact with second cam surface means formed on said equalizer means with said remote outer end surfaces in sliding engagement with said cam surface means of said first and second hanger means, and wherein each of said leaf springs arranged in tandem alignment are substantially identical.

8. The suspension system of claim 2, wherein said first tapered thickness profile of said first leaf member is adapted to provide a soft damping characteristic when said trailer is operating in a substantially unloaded condition, said second tapered thickness profile of said second leaf member being adapted to coact with said first leaf member for variably increasing said damping characteristic in response to the amount of deflection imparted on said first and second leaf members.

9. In a suspension system for a trailer having axle means and a chassis frame, first and second hanger means mounted in tandem on each side of said chassis frame, a variable rate dual-leaf spring assembly operably coupled to said axle means and disposed between said first and second hanger means for damping the relative movement between said axle means and said chassis frame, said variable rate dual-leaf spring assembly comprising:

a first elongated leaf member having a portion of its upper end surfaces in sliding contact with cam surface means provided on said first and second hanger means, said first leaf member having a first tapered thickness profile; and a second elongate leaf member disposed below and coupled to said first leaf member such that a portion of its upper end surfaces are adapted to move between positions of disengagement and engagement with lower end surfaces of said first leaf member in response to deflection of said dual-leaf spring assembly, said second leaf member having a second tapered thickness profile;

wherein said first and second tapered thickness profiles include a series of more than three successive linearly tapered increments which each define a different amount of thickness taper per unit of length measurement, said linearly tapered increments having different incremental tapers sequentially arranged and configured to approximate a modified parabolic taper profile, said upper end surfaces of said second leaf member being normally disengaged from said lower end surfaces of said first leaf member when said trailer is operating in a first loaded condition such that engagement of said upper end surfaces of said first leaf member with said cam surface means causes said dual-leaf spring assembly to provide a soft damping characteristic, and wherein said upper end surfaces of said second leaf member are adapted to engage said lower end surfaces of said first leaf member when said trailer is operating in a second loaded condition for providing a firmer damping characteristic.

10. The suspension system of claim 9, wherein each of said first and second leaf members have a predetermined curvature such that an internal gap is located between a central clamp portion and said engaging end surfaces for said first and second leaf members when said trailer is operating in said second loaded condition, said internal gap provided for minimizing interleaf friction between said first and second leaf members during deflection thereof during operation of said trailer in either of said first and second loaded conditions.

11. The suspension system of claim 9, wherein said first and second tapered thickness profiles and sliding engagement of said second leaf member relative to said first leaf member are coactive to provide a generally parabolic first rate transition in response to deflection of said second leaf member from said engagement position toward a position corresponding to said trailer operating in said second loaded condition, said sliding engagement adapted to effectively shorten the active length of said second leaf member.

12. The suspension system of claim 11, wherein said first and second tapered thickness profiles and sliding engagement of said first leaf member relative to said cam surface means are coactive to provide a generally parabolic second rate transition between said first parabolic rate transition and said deflected position corresponding to said second loaded condition in response to still further deflection of said first and second leaf members.

13. The suspension system of claim 10, wherein said working stress level of said first leaf member is greater than that of said second leaf member, and wherein each of said first and second tapered thickness profiles are configured to uniformly distribute said working stresses across substantially the entire active length of said first and second leaf members.

14. The suspension system of claim 10, wherein said axle means defines a front and rear tandem axle arrangement with a pair of said dual-leaf spring assemblies mounted in tandem alignment one behind the other on each side of said chassis frame, each of said dual-leaf spring assemblies including clamp means for coupling the mid-portion of said first and second leaf members for each of said tandem dual-leaf spring assemblies to said front and rear axles respectively such that said tandem dual-leaf spring assemblies have inner ends disposed adjacent to one another and outer ends spaced remotely from one another, and equalizer means operably located between said first and second hanger means such that said adjacent upper end surfaces of said tandem dual-leaf spring assemblies are in sliding contact with second cam surface means formed on said equalizer means with said remote outer end surfaces in sliding engagement with said cam surface means of said first and second hanger means, and wherein each of said dual-leaf spring assemblies arranged in tandem alignment are substantially identical.

* * * * *

UNITED STATES PATENT AND TRADEMARK OFFICE
CERTIFICATE OF CORRECTION

PATENT NO. : 5,209,518
DATED : May 11, 1993
INVENTOR(S) : Mark A. Heckenliable et al It is certified that error appears in the above-indentified patent and that said Letters Patent is hereby corrected as shown below:

Column 1, line 56, "stages" should be -- stage --.

Column 1, line 68, "ligh-duty" should be -- light-duty --.

Column 3, line 16, after "each" insert -- of --.

Column 3, line 32, "multi-iaxle" should be -- multi-axle --.

Column 5, line 1, "of" (first occurrence) should be -- on --.

Column 5, line 4, "substantial" should be -- substantially --.

Column 5, line 12, "particularly" should be -- particular --.

Column 5, lines 24 & 25, "complimentary" should be -- complementary --.

Column 5, line 31, "matter" should be -- manner --.

UNITED STATES PATENT AND TRADEMARK OFFICE
CERTIFICATE OF CORRECTION

PATENT NO. : 5,209,518
DATED : May 11, 1993
INVENTOR(S) : Mark A. Heckenliable et al It is certified that error appears in the above-indentified patent and that said Letters Patent is hereby corrected as shown below:

Column 7, line 57, delete "a".

Column 8, line 24, "an" should be -- a --.

Column 9, line 59, "afixed" should be -- affixed --.

Column 10, line 20, "90" should be -- 83 --.

Signed and Sealed this

Nineteenth Day of April, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,209,518
DATED : May 11, 1993
INVENTOR(S) : Mark A. Heckenliable, et al It is certified that error appears in the above-indentified patent and that said Letters Patent is hereby corrected as shown below:

Column 4, line 8, "tampered" should be --tapered--.

Signed and Sealed this

Fourteenth Day of June, 1994

Attest:

BRUCE LEHMAN

*Attesting Officer*  *Commissioner of Patents and Trademarks*